United States Patent
Friedman

(10) Patent No.: US 9,953,365 B2
(45) Date of Patent: Apr. 24, 2018

(54) VIRTUAL ONLINE AUCTION FORUM

(71) Applicant: Ten-X, LLC, Irvine, CA (US)

(72) Inventor: Robert Friedman, Irvine, CA (US)

(73) Assignee: Ten-X, LLC, Irvine, CA (US)

( * ) Notice: Subject to any disclaimer, the term of this patent is extended or adjusted under 35 U.S.C. 154(b) by 0 days.

(21) Appl. No.: 14/216,962

(22) Filed: Mar. 17, 2014

(65) Prior Publication Data

US 2014/0279164 A1  Sep. 18, 2014

Related U.S. Application Data

(60) Provisional application No. 61/800,264, filed on Mar. 15, 2013.

(51) Int. Cl.
*G06Q 30/08* (2012.01)
*G06Q 30/02* (2012.01)

(52) U.S. Cl.
CPC ......... *G06Q 30/08* (2013.01); *G06Q 30/0275* (2013.01)

(58) Field of Classification Search
CPC .................................... G06C 30/0275
USPC ............................. 705/26.1, 14.71
See application file for complete search history.

(56) References Cited

U.S. PATENT DOCUMENTS

| | | | |
|---|---|---|---|
| 2006/0080224 A1* | 4/2006 | Schuelke | G06Q 30/08 705/37 |
| 2011/0040645 A1* | 2/2011 | Rabenold et al. | 705/26.3 |
| 2012/0084169 A1* | 4/2012 | Adair et al. | 705/26.3 |
| 2014/0143081 A1* | 5/2014 | Finkelstein et al. | 705/26.3 |

* cited by examiner

*Primary Examiner* — Mila Airapetian
(74) *Attorney, Agent, or Firm* — Mahamedi IP Law LLP

(57) ABSTRACT

A method and system for auctioning an item over a network inside a virtual auction forum populated by graphical representations of users is described. Virtual profiles containing graphical representations are associated with each of the users of an auction forum, and the auction for the item is virtualized. The users of the auction forum participate as bidders in the virtual auction with their graphical representations, and some events in the virtual auction are represented through the users' graphical representations.

18 Claims, 5 Drawing Sheets

VIRTUAL ONLINE AUCTION FORUM

RELATED APPLICATION

This application claims the benefit of priority to Provisional U.S. Patent Application No. 61/800,264, filed Mar. 15, 2013, entitled VIRTUAL ONLINE AUCTION FORUM; the aforementioned priority application being hereby incorporated by reference in its entirety.

TECHNICAL FIELD

Examples described herein relate to online markets, and more specifically, to a virtual online auction forum.

BACKGROUND

Numerous online auction forums exist that enable consumers and sellers to transact for various kinds of items, such as collectibles, electronics and other goods or services. Typically, online auctions are rendered as a web page in which the event information such as the current bid price is updated in real-time.

DETAILED DESCRIPTION

Figure 1:
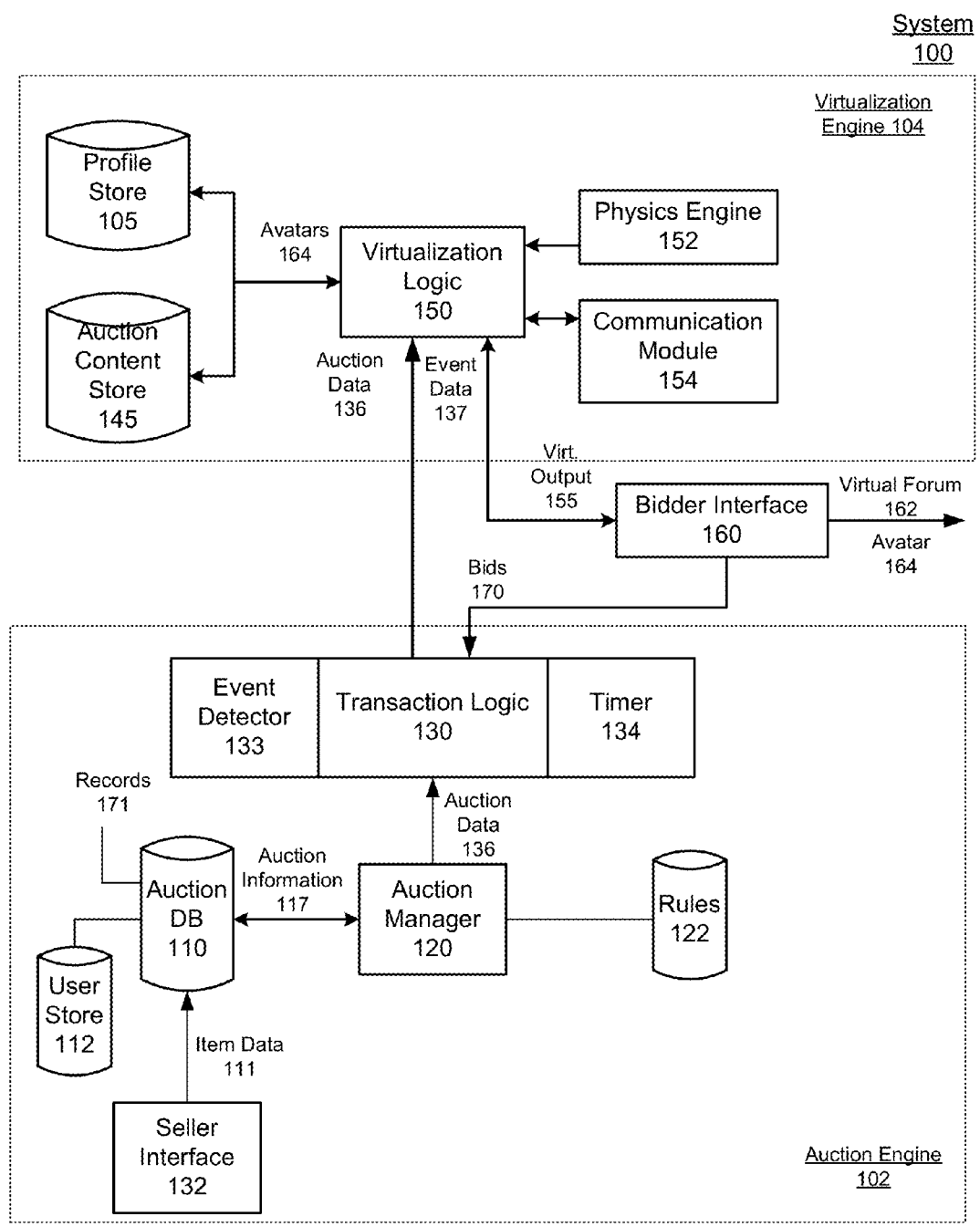
FIG. 1 illustrates an example system for rendering and managing a virtual auction forum.

Examples described herein include a method of auctioning an item over a network using a virtual auction forum. The virtual auction forum can include graphical representations of users and events that occur during the auction process. The users of the online auction forum can be associated with virtual profiles which specify graphical representations (e.g., avatars) for each user. Some users of the auction forum can participate as bidders in the virtual auction, in which case the online auction is rendered using the respective graphical representations of the individual bidders. Furthermore, some events in the virtual auction forum maybe virtualized to simulate a physical virtual forum.

According to some examples, a user interface is provided for an online auction which shows a virtual auction virtual forum (e.g., auction room) and graphical representations (e.g., avatars) for each participant populating the virtual forum. Interactive elements in the user interface include avatars for other participants, an auctioneer, and one or more virtualized aspects of a virtual forum which simulate the physical world.

Embodiments described herein recognize that bidders are encouraged to bid in auctions where there is a greater sense of competitiveness and human interaction. In such virtual forums, bidders can be motivated through awareness and interaction with the auction virtual forum. The motivation and excitement can induce bidders to continue participation in an auction.

According to some embodiments, a forum is provided for conducting an auction for an asset. The forum can be provided by a system for enabling transactions in a networked virtual forum, such as an online auction system. The forum can enable users to participate with the auction using a computing device over one or more networks. The forum, for example, can enable a user to bid on the asset when the auction is in progress, enable a seller to monitor the auction of the asset, and allow users to watch the auction in progress without placing bids. The progress and event information for the auction can be displayed in various ways, such as through applications, webpages accessible with a web browser, or a virtual forum with users represented graphically.

In an example, for users to participate in the virtual auction forum, a virtual profile is associated with each of the users of the auction forum. These virtual profiles contain content including a graphical representation of the user, such as an avatar, which may be a two-dimensional picture or a three-dimensional model depending on the virtual forum. Furthermore, virtual profiles can include other user-identifying details, such as a username, color, location, etc., and preferences for the virtual forum and auction.

In one example, each of the users participates in the auction as a bidder. In the process of virtualizing the auction for the item, each of the users is represented by their respective graphical representation (e.g., the avatar). These representations can be stored locally on devices associated with the users and rendered with instructions from the auction forum. For example, when a user connects to the auction forum's virtual forum, the auction forum can send the user a list of other participating users accompanied by data identifying the appearance of their respective avatars. In this way, the user can see the visual representations of the other users on a device.

While users are participating in the virtual forum, some events in the auction are represented through manipulation of the graphical representations of each user. In one embodiment, actions taken by individual users are performed by their respective avatars in the virtual forum. For example, if a user places a bid, the user's avatar may raise a hand or a bidding sign to signal the bid, or if the user wins an auction, the user's avatar may celebrate the purchase.

Sill further, in some variations, the virtual forum can enable the use of sound and media. For example, the avatars can speak works (e.g., shout out a bid), and auction events (e.g., sounding of the auctioneer) can be outputted as media to the bidders. The voices of the avatars can be based on the bidder's voice, or programmatically selected or generated.

According to some embodiments, the virtual auction takes place in a virtual auction forum with multiple users participating in the auction as bidders located in the virtual auction forum. In this example, when a bidder places a bid on the item being auctioned, all users participating in the virtual forum are able to see and/or interact with the forum or bidder.

Event information for the virtual auction can optionally be displayed separately from virtualizing the auction, such as on a webpage or non-graphical application. This event information can include descriptions of items for auction, bidding prices, and a list of users participating in the virtual auction, among other things. In one embodiment, the webpage is configured to accept bids for the item being auctioned for the duration of the virtual auction. In this manner, users outside of the virtual forum may compete with users inside being represented graphically. In one example, an auctioneer or auction interface may display these bids. In another example, bidders outside the virtual forum may be given default avatars to be displayed within the virtual forum.

In a further example, the virtual auction includes a virtual auctioneer programmed to conduct the auction. This virtual auctioneer can reside on the auction forum and be represented in the virtual forum with a graphical representation similar to a user. In one example, auction events such as introducing a new item, receiving a bid, and declaring a winner can be represented graphically through the auctioneer avatar. In one embodiment, one of the users may act as auctioneer for the virtual auction instead. For example, an agent of the auction forum may play this role to give the virtual auction an authentic feel.

Bids received from users during the virtual auction for the item can be automatically processed by the auction forum while the auction is in progress. Furthermore, the auction can then be updated with the processed bids. In one example, users in the virtual forum can see bids placed in real time as they are processed and updated.

Among other benefits, examples described herein recognize that existing online auctions are deficient as to providing a competitive virtual forum based on the presence of other participants. By depicting the virtualized forum and the associated media, more bidding interest can be generated, resulting in more auction activity and potentially better auction results.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs.

Auction Architecture

FIG. 1 illustrates an example system for rendering and managing a virtual auction forum. A system such as shown by FIG. 1 can be implemented in connection with an online auction service for any type of commercial item, such as, for example, real property items, (e.g., homes, real-estate notes, commercial property), motor vehicles (e.g., automobiles, motorcycles, boats), consumer electronics, collectibles, or clothing. Elements of FIG. 1 include functionality that can be implemented by processes, logical components and/or modules. For example, some elements of the embodiment of FIG. 1 may be implemented using elements on a user's computing virtual forum. Accordingly, some embodiments provide that some elements of FIG. 1 are implemented as a run-time system by elements in a user's web browser. For example, a script may be provided as part of a web resource, and processes in a web browser may implement elements of FIG. 1 in response to the browser loading the script upon accessing the web resource. Other embodiments provide that some elements of FIG. 1 are implemented by an application that functions on a client device. Further embodiments provide that other elements of FIG. 1 are implemented by an auction provider.

In an example of FIG. 1, the components of system 100 can combine to enable a method of auctioning an item using a virtual auction forum. In one example, system 100 includes an auction engine 102 and a virtualization engine 104. The auction engine 102 includes a seller interface 132, auction manager 120, and transaction logic 130. The system 100 also includes a virtualization engine 104 comprising virtualization logic 150, physics engine 152, and communication module 154. The auction engine 102 and the virtualization engine 104 each communicate with a bidder interface 160. System 100 can also include one or more data stores, including an auction database 110, and an auction user profile store 112.

In an example of FIG. 1, sellers specify items which they wish to place on auction through seller interface 132. Auction database 110, coupled to seller interface 132, stores records for auctions, corresponding to information about items received from seller interface 132. For example auction database 110 retains records that identify items that are to be auctioned, and/or items which are undergoing or have completed an auction. The seller interface 132 enables individual sellers to create records 171 that identify an item for auction. The seller interface 132 can enable sellers to specify information that identifies the item being auctioned, the terms of sale, and other parameters such as a reserve price. The auction database 110 can retain records of auctions in various states, including pre-auction, in-auction (auction initiated) and post-auction (auction completed). The auction database 110 stores records for auctions, including auctions that are in progress, prior auctions, and auctions which are to initiate in the future. Each record can specify an asset for an auction. The record 171 can include information, such as an identifier (e.g., parcel and address for real-estate, model and serial number, product type, descriptive material) and descriptive content (e.g., text and images). The record 171 can include information that is based on input from a seller.

The auction user profile store 112 can maintain historical information about an auction user, including bid history, and seller history. The auction user profile store 112 can be integrated or combined with the auction database 110, or it can be maintained separately.

Auction manager 120 retrieves auction information 117 from the auction database 110. Auction manager 120 uses the records 171 for current auctions in order to initiate an auction process. In particular, the auction manager 120 signals auction information 136, corresponding to the initial data set of the auction. The auction information 136 can identify an auction, identify the seller, the asset, provide information about the asset, specify the rules of the auction and maintain a reserve (hidden). A particular auction can be conducted according to a set of rules 122, which can optionally differ amongst auctions. The rules can specify the auction format, the timing parameters, whether there is a reserve, etc.

The transaction logic 130 can initiate with the auction information 136, then execute to progress the auction towards completion. In particular, the transaction logic outputs auction information 136 (e.g., auction identifier, asset information and identifier, seller) for the output processes, which include the virtualization engine 104 and/or bidder interface 160. Additionally, the transaction logic 130 can receive bids, timing information and other events (e.g., bidder joining an auction, asking a question, reserve price information), and then generate corresponding event information 137 (e.g., top bid, whether reserve is met, bidders) that updates the state of the auction for the virtualization engine 104 and/or bidder interface 160.

In one implementation, the transaction logic 130 can initiate a timer 134 for an auction, and manage the timer for the auction completion. The transaction logic 130 can further include event detector 133, which can, for example, detect bids. The receipt of bids 170 can update auction information 136, including the top bid, the bidders (and/or top bidder), and/or current auction state (e.g., indication of whether reserve price has been met). The auction information 136 and the event information 137 collectively provide the state of the auction in real-time. The transaction logic 130 can signal the auction information 136 and the event information 137 to the bidder interface 160.

Still further, the transaction logic 130 can output the event information 137 to the virtualization logic 150. The virtualization logic 150 can use the auction information and the event information 137 to depict the auction in a virtual forum 162. More specifically, the virtualization logic 150 can implement a virtual or graphical framework for the virtual auction forum, then populate the framework with selected content items that are specific to the auction and bidders. The virtualization logic 150 can also manipulate selected content items for the framework in a manner that simulates a real-world virtual forum 162. In this way, the virtualization logic 150 can generate and render content corresponding to a virtual auction forum 162 to the bidder interface 160. More specifically, the virtualization logic 150 can use the auction information 136 to select content items from the auction content store 145. For example, content aspects such as the virtualized auction room or virtual forum 162, the depiction of the asset, and the depiction of the auctioneer can be based on content selected from the auction content store 145 using the auction information 136.

Additionally, the bidders can be identified from the auction information 136 and/or the event information 137. The identity of the bidders can be cross-referenced to the user profile store 105 of the virtualization engine 104. The user profile store 105 can provide the content (e.g., avatars) for bidders and participants of the auction, which are to be depicted by the online auction forum. In an embodiment, user profile store 105 maintains avatars (e.g., virtual characters) for individual bidders of the auction. The virtual character can be selected by the individual users as part of a registration process. Each user may select attributes, appearances and other features based on desired characteristics, or each user may select characters with pre-determined characteristics. For example, individual users can configure an avatar for appearance or even virtual demeanor (e.g., aggressive bidder, passive), as well as other characteristics (e.g., age, gender).

When the auction is in progress, the virtualization logic 150 can generate output 155 that corresponds to the depiction of actions or events. The output 155 can be implemented in whole or in part using content from the user profile store 105, the auction content store 145, and/or the physics engine 152. The physics engine 152 can correspond to a component that correlates one or more of (i) a state of the auction or (ii) an event to one or more dynamic effects and/or results in the manner in which content items of the virtualized virtual forum 162 are depicted. In this way, the physics engine 152 can be used to depict real-world events of the auction. In some examples, the physics engine 152 depicts real-world events based on the event information 137. For example, the physics engine 152 can depict an event corresponding to a new bid by way of the virtual avatar of the bidder standing up in the auction room and/or raising a paddle. The physics engine 152 can affect the action and appearance of the avatar in response to activity by the corresponding bidder. The physics engine 152 can also affect lighting, the appearance of other avatars or drones (program-controlled avatars), or other aspects of the auction forum. Still further, the virtualization logic 150 can use the physics engine 152 to depict the auctioneer moving about and soliciting bids.

The output 155 of the virtualization logic 150 can also include communication output generated by the communication module 154. Communication module 154 provides functionality for enabling a user to communicate with other characters shown by bidder interface 160. Examples of communication enabled by communication module 154 include instant chat engines, messages displayed onscreen (e.g., "speech bubbles"), and messages delivered directly to other users. Communication module 154 may also enable a user to interact with a virtual auctioneer. In particular, the communication module 154 can be used to conduct communication exchanges between interested parties of the auction, such as between bidders, prospective bidders and seller. The communication module 154 can depict communications as, for example, on-screen chats. In a variation, the communication module 154 can depict the communications as avatars speaking with one another (e.g., using physics engine 152).

In an example of FIG. 1, the virtualization output 155 can be communicated to the bidder interface 160. In one implementation, the bidder interface 160 can correspond to a web page or an application interface that communicates to a network site. In an example of FIG. 1, bidder interface 160 is generated on a client device in response to a bidder accessing a virtual auction. For example a bidder may access a webpage which triggers generation of bidder interface 160 on the client device. In another example, the bidder accesses the virtual auction by providing a bid for an item on auction, such as through interacting with a webpage. In a third example, the bidder accesses the virtual auction by registering with the auction. In a further example, the bidder accesses the virtual auction through an application functioning on a client device. In an example where the bidder does not provide identification information (e.g., accessing a webpage without registration), a default avatar may be provided for a bidder.

The bidder interface 160 can display numerous kinds of forums 162 based on the virtualization output 155. For example, the virtual forum 162 can include information about items on auction, profile information about other participants, the auction history (such as bids), and a timer to show time remaining in the auction. The virtual forums 162 can be responsive to selection of the user and/or auction events.

By way of example, the virtual forum 162 depicted through the virtualization output 155 can provide for elements such as avatars 164 to be rendered in different perspectives. For example, the avatars may be oriented in a side perspective (e.g., the example of FIG. 3A) or from a behind-the-head/straight-on perspective (e.g., the example of FIG. 3B). As further described regarding FIGS. 3A and 3B, embodiments provide for the orientation of each of the avatars to be varied based on conditions (e.g., preferences of the user associated with the avatar stored in personal profiles; preferences of the viewing user; conditions defined by auction manager 120).

In some implementations, the execution of the auction process affects various aspects of the virtualized virtual forum 162, as depicted by the bidder interface 160 using the virtualization output 155. For example, the auction manager 120 may define auction rules 122 which cause the virtual forum 162 to change based on trigger conditions, such as time remaining, bids increasing to a certain level (e.g., a high bid could be more exciting, corresponding to flashing lights or different colors being used to illuminate the virtual auction forum), bids being made rapidly by participants, or other conditions. For example, auction manager 120 implement auction rules 122 which cause the virtualization logic 150 to generate output that corresponds to depiction of "exciting" elements (e.g., display statements from other avatars, solicit bids, show sound and animation, show video, display lights, change color or lighting of virtual forum (e.g., room where avatars sit), play motif music, etc.). Such elements can be displayed and generated in response to events and condition such as the bidding activity reaching a threshold (e.g., the velocity of the bidding reaching a threshold, the reserve price being met, the top bid exceeding some designated amount, etc.) and/or the time remaining to completion of the auction reaching a threshold (e.g., 1-minute left). Furthermore, the virtual forum 162 as depicted via the bidder interface 160 can change based on conditions occurring in rules which are provided to transaction logic 130.

In another embodiment, the virtual forum 162 may include other functions (e.g., sound) which a computing device can produce. For example, virtualization logic 150 can generate virtualization output 155 which includes audio data for causing a computing device to vibrate when a user's bid is exceeded by a new bid. As another example, the avatars of the virtual forum 162 can communicate with one another or with human participants via their respective mobile devices. Numerous such examples are possible.

In embodiments, the bidder interface 160 uses the virtualization output 155 to display a virtual forum 162 including a virtual auction forum, and the virtual forum 162 includes avatars 164 and dynamic events such as provided for by the physics engine 152. The virtual auction forum may include interactive features, such as a virtual auctioneer and virtual auction board, which the virtual character interacts with to bid on items. In another embodiment, the virtual character enables the user to interact with other characters, representing other auction participants, on the screen.

The bidder interface 160 includes functionality for enabling bidders to view and participate in an in-progress auction. Accordingly, the bidder interface 160 can include functionality for enabling a bidder to specify a bid 170 and to monitor in real time the current value of the item being auctioned. As such, bidder interface 160 can detect which auctions a bidder is viewing and provide bids 170 and information that the bidder is viewing and participating in the auction in real time to transaction logic 130. Transaction logic 130 then determines, from each bidder accessing the auction and providing such information, which bidders are participating in the auction. The transaction logic 130 updates the top bid in response to a given bid, and the resulting event information 137 is communicated to the virtualization engine 104 for rendering to the bidder interface 160.

In some variations, system 100 implements programmatic bidding functionality in which the auctioneer (as represented through system 100) bids on behalf of the seller in order to generate bidding enthusiasm and to have the bid price approach the reserve price. For example, if the last bid for merchandise on sale was below a reserve price (e.g., a minimum price that the seller wishes to sell the item for) the auction rules 122 can specify that the auction manager 120 and/or transaction logic 130 can bid on behalf of a seller, above the last bid but below the reserve price. If no bids are then received above the reserve price by a certain point in the auction (e.g., near the end of the auction), then the seller maintains control of the item. As such, embodiments provide for transaction logic 130 to execute to bid on behalf of the seller when a price of merchandise is below the reserve price. The reserve price may be hidden (or optionally displayed) as part of auction information for use by the participants in the auction. In another embodiment the bid identifies a bidder which is not present.

According to some embodiments, the bidder interface 160 can operate independently of the virtualization engine 104. For example, some users may prefer to view the auction as a webpage, without additional features of virtualization. In such embodiments, the auction engine 102 can communicate with the bidder interface 160 to render auction content corresponding to the auction information 136 and the event information 137. This information can be rendered as text and images, for example, which is updated in real-time until the auction ends.

Methodology

Figure 2A:
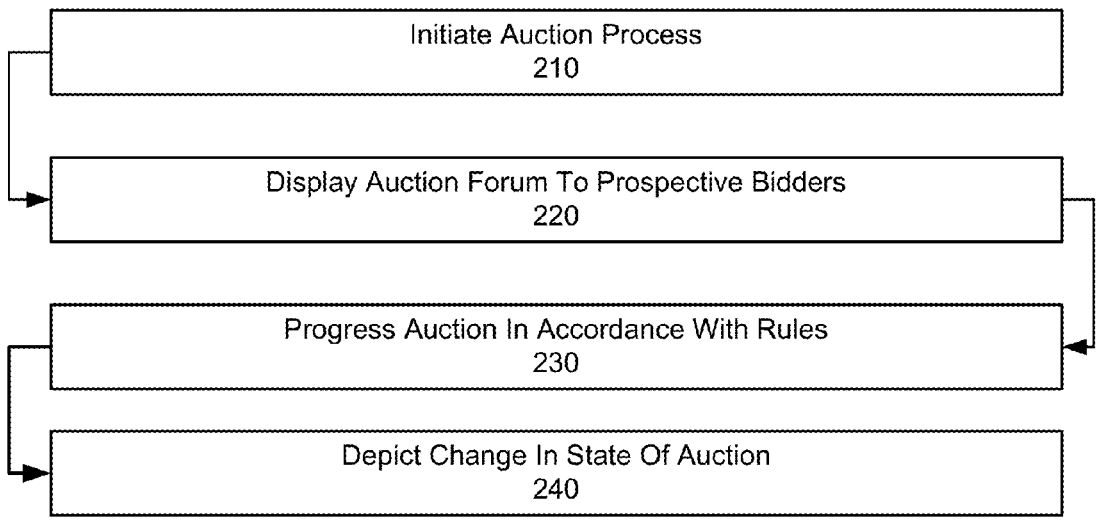
FIG. 2A illustrates an example method for rendering and managing a competitive virtual auction forum.

FIG. 2A illustrates an example method for rendering and managing a competitive virtual auction forum. While operations of the method 200 are described below as being performed by specific components, modules or systems of the computer system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to FIG. 2A, an auction process is started. The auction process can be initiated for an asset and made available for bidding to a set of prospective bidders. (210) In an example of FIG. 2A, an auction manager 120 initiates the auction process using a record 171 of the auction database 110. The auction information 137 (as determined from the record 171) is communicated to an instance of transaction logic 130.

The auction process can be displayed as a virtualized forum to prospective bidders (220). Examples provide that the bidder accesses the auction forum in various ways. For example, an application that functions on a client device may provide the bidder access when the user accesses an auction through the application. In another example, a bidder may access a webpage that includes functionality which, when executed on a client device, provides access to the auction. In a third example, the bidder accesses the virtual auction by providing a bid for an item on auction, such as through interacting with a webpage.

According to some embodiments, the virtualization engine 104 executes on or with the user devices to enable the respective devices to render a virtual auction forum. According to some embodiments, each user is identified, and the virtual user profile (e.g., avatar) from the user profile store 105 is retrieved. Additionally, the auction information 136 for the auction is used to identify or select content from the auction content store 145. The selection of items from the auction content store 145 can be different for different users, based on preferences of the respective users. Each bidder profile may contain user-identifying details, such as name and location. Some profile information for the user can be programmatically implemented, such as information identifying the preferences of the user, or bidding style. The profile may also specify a graphical representation (e.g., an avatar) of the bidder. In this way, the virtualization logic 150 can use assembly content items from the user profile store 105 and auction content store 145 to generate the virtual auction representation with the other users.

Based on the defined auction rules, an auction is progressed (230). Once initiated, the auction progresses towards completion to end at a given time, subject to implementation of rules 122 by the auction manager 120. Once initiated, the auction process is subjected to events, such as bids received from bidders who view the auction. For example, in response to a trigger condition (e.g. a reserve price is not met) transaction logic 130 bids on the item for auction, to increase the bid price but remaining below the reserve price.

As the auction progresses, event information 137 generated by the transaction logic 130 can be used by the virtualization engine 104 to depict the change in the state of the auction (240). The virtualization engine 104 can implement functionality to depict the auction and the events in a simulated virtual forum 162. For example, a virtual auction forum is depicted in which a virtual auctioneer solicits bids and avatars representing bidders supply bids. Furthermore, the state of the auction can be depicted on a virtual screen, within a room where bidders and auctioneer reside. For example, the virtual output 155 generated from auction information 136 and event information 137 can be displayed in the virtual forum 162 using a simulated television monitor, or rendered in three-dimensions on a board, marquee, etc.

Figure 2B:
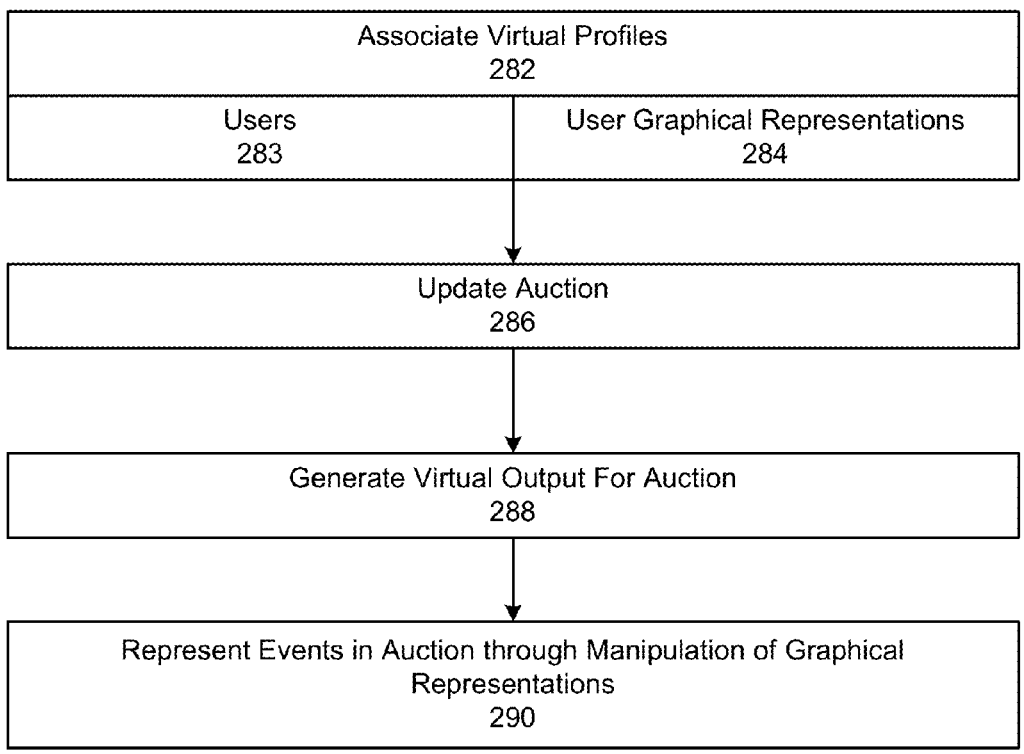
FIG. 2B illustrates an example method for auctioning an item with virtual representations of bidders in a competitive virtual auction forum.

FIG. 2B illustrates an example method for auctioning an item with virtual representations of bidders in a competitive virtual auction forum. With reference to an example of FIG. 1, virtualization logic 150 associates virtual profiles for the bidder and other participants in the virtual auction (282). When a new user connects to the auction forum and logs in to the virtual auction, auction manager 120 provides a list of other users already in the virtual auction along with their associated data (283). With this data, virtualization logic 150 can use the graphical representations (284), including retrieving avatars 164 for the other users from the user data store 105 and rendering them along with the auction forum interface.

Furthermore, the auction engine 102 provides real-time updates and information about the auction, such as time remaining and reserve prices (286). The process for bidding includes functionality initiated by transaction logic 130. For example, the transaction logic 130 implements auction rules 122 provided from auction manager 120 (e.g. initiates a timer, accepts bids, responds to triggers based on auction rules).

The virtualization engine 104 uses information generated by the auction engine 102 to generate the virtual output 155 for depicting the auction (288). The resulting virtual forum 162 can include avatars 164 of users (e.g., prospective bidders), programmatic elements (e.g., auctioneer), other content (e.g., virtual depiction of the asset, virtual depiction of the auction status).

While users are participating in the virtual forum 162, some events in the auction may be represented through manipulation of the graphical representations of individual users (290). In one embodiment, actions taken by individual users are performed by their respective avatars 164 in the virtual forum 162. For example, if a user places a bid, the user's avatar may raise a hand or a bidding sign to signal the bid, or if the user wins an auction, the user's avatar may celebrate the purchase. In a further example, auction events such as introducing a new item, receiving a bid, and declaring a winner can be represented graphically through the auctioneer avatar.

EXAMPLES

Figure 3A:
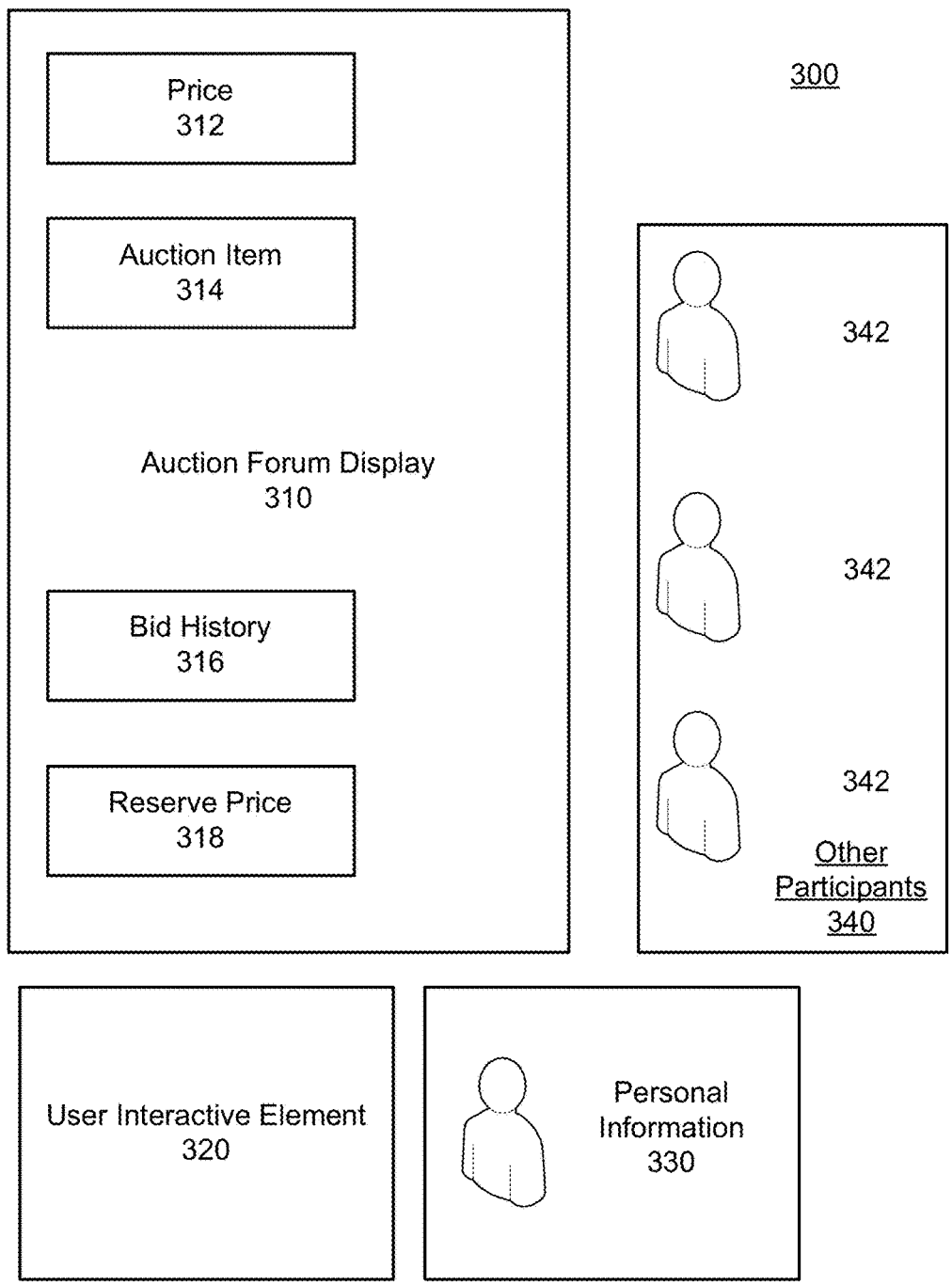
FIG. 3A illustrates an example screenshot of a competitive virtual auction forum from a side perspective.

FIG. 3A illustrates an example screenshot of a competitive virtual auction forum from a side perspective. The embodiment of FIG. 3A may be generated by elements and processes as described in FIG. 1, FIG. 2A, and FIG. 2B. For example, the interface of FIG. 3A may be generated for a user accessing an auction forum to participate in a virtual auction. Accordingly, FIG. 3A and FIG. 3B each provide an example of a virtual forum 162, utilizing avatars and other virtual features, as described with an example of FIG. 1.

In an embodiment, a preference for avatar orientation (e.g., the side perspective of FIG. 3A) may be pre-set by each individual auction participant (such as in their personal profile), and the avatar is rendered by other auction participants according to the pre-set preference. In another embodiment, the orientation is based on preferences set by the viewer (e.g., stored preferences in the profiles manager). In a third embodiment, an auction manager 120 defines the orientation, and, through transaction logic 130, virtualization logic 150 associated with each auction participant renders the avatars 164 in the same orientation.

In the example of FIG. 3A, the user joins an auction. Features about the auction itself are shown by auction forum display 310, in which various other participants 340 are participating and represented by graphical representations 342 (e.g., avatars 164). In an embodiment, the user joins the auction by accessing an online resource (e.g., virtual auction website). Alternatively, the user may join the auction through an application such as on a mobile device or desktop computer or through a plug-in associated with another application, such as a web browser. A user provides some sort of input (e.g., through user interactive element 320) or identification information such as a username and password to authenticate and join the auction. In another example, a cookie may be stored in a user's web browser or device, and when the user accesses the online resource, the user is automatically authenticated through the cookie and entered into the auction.

In the example of FIG. 3A, a price 312, auction item 314, bid history 316 and reserve price 318 describe information about an ongoing auction, which may be customized based on the user preferences. User interaction element 320 represents, for example, an interface element to receive user input such as a bid, questions directed towards the auctioneer or auction forum, chat between other participants, etc.

The example of auction virtual forum 162 further shows personal information 330, corresponding to the user in FIG. 3A who is accessing the auction forum display 310. In an example, personal information 330 shows information which is useful for the particular user. For example, personal information 330 may show information such as an avatar of the user which is being displayed to other users. The user can therefore easily determine what information is being publicly displayed to other users. Other examples of personal information include a personal maximum bid, reminders, and any information potentially useful for a user which the user may wish to keep private.

In the example of FIG. 3A, a portion of the displayed auction forum 310 displays other participants 340 in the auction, each associated with an avatar 342. Embodiments provide for other information to be displayed in conjunction with avatar 342, based on, for example, personal information supplied by the other users. Other information may include usernames, whether the user has placed a bid on the current item for auction, messages sent by the user, emotions displayed by the user's avatar, etc.

In the example of FIG. 3A, a corresponding auction virtual forum 162 300 may be generated on a corresponding device for each other user. For example, from the perspective of other users, the user accessing auction virtual forum 162 300 in FIG. 3A is represented by an avatar 342 as one of the other participants 340.

Figure 3B:
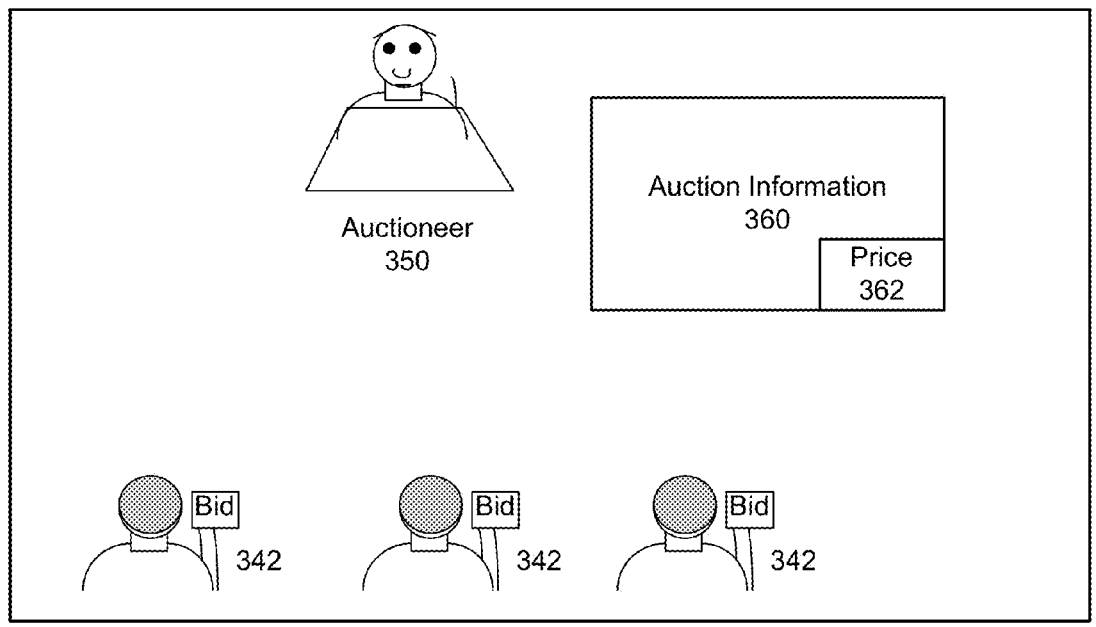
FIG. 3B illustrates an example screenshot with an auctioneer from a behind-the-head perspective.

FIG. 3B illustrates an example screenshot with an auctioneer from a behind-the-head perspective. As described regarding FIG. 1 and FIG. 3A, the orientation for each avatar may be varied.

As shown in FIG. 3B, a process executes to render virtual auctioneer 350, who represents the auction forum during the auction. In the embodiment of FIG. 3B, the auctioneer is shown in a head-on view with each of the auction participants having a behind-the-head view. Embodiments provide for orientations of the auctioneer and auction participants to be varied. For example, the orientation of the auctioneer may be further varied to emphasize the appearance of the auctioneer over the user participants. Furthermore, other attributes of the auctioneer may also be varied for emphasis, such as the size of the auctioneer's avatar and visual effects.

In an embodiment, the virtual auctioneer 350 is automated, for example, by data received from, with reference to FIG. 1, an auction manager 120. For example, transaction logic 130 may provide functionality, based on rules received from an auction manager 120, corresponding to the auctioneer. Furthermore, in such an example the transaction logic 130 may enable each virtualization logic 150, associated with each auction participant, to render auctioneer 350 as part of the auction virtual forum 162 (e.g., via code sent from transaction logic 130). In another embodiment, the auctioneer 350 may be controlled by another user, such as an agent of the auction forum, with a special auctioneer interface to control the flow of the auction.

Information about the auction, including the price 362 of the item being sold, can optionally be displayed in the virtual forum 162 as part of auction information 360. Participants in the auction can interact with the auctioneer 350, such as by directly chatting with the auctioneer 350, to perform actions such as bidding. The bidder associated with personal information 330 (as illustrated for example in FIG. 3A) may have a customized appearance, such as by profile information as described above regarding FIG. 1.

Examples provide for auctioneer 350 and auction information 360 to be dynamically updated in real time. For example, as bids come in from participants, auction information 360 and price 362 are updated to reflect the new bids. Similarly, as participants represented by avatars 164 342 enter or leave the auction, the displayed representations change.

Embodiments provide for auctioneer 350 to include functionality for auction forum bidding (e.g., "chandelier bidding"). In such embodiments, when price 362 is below a reserve price (i.e., a minimum price that the seller wishes to sell the item for) the auction forum may bid on behalf of a seller to increase the price 362. If no bids are then received above the reserve price, then the seller maintains control of the item. As such, embodiments provide for a process maintaining auctioneer 350 to, for example, execute to provide functionality to bid on behalf of the seller when price 362 is below the reserve price. In such embodiments, the reserve price may be displayed as part of auction information for use by the participants in the auction.

Numerous triggers may invoke the functionality for auction forum bidding. For example, a process maintaining auctioneer 350 may include functionality such that, if a certain amount of time elapses without a bid increasing price 362 to the reserve price, the auctioneer 350 bids on behalf of the seller. In another example, the process maintaining auctioneer 350 increases the bid based on a non-existent bidder. In a third example, the process is done invisibly to other users.

Computer System

Figure 4:
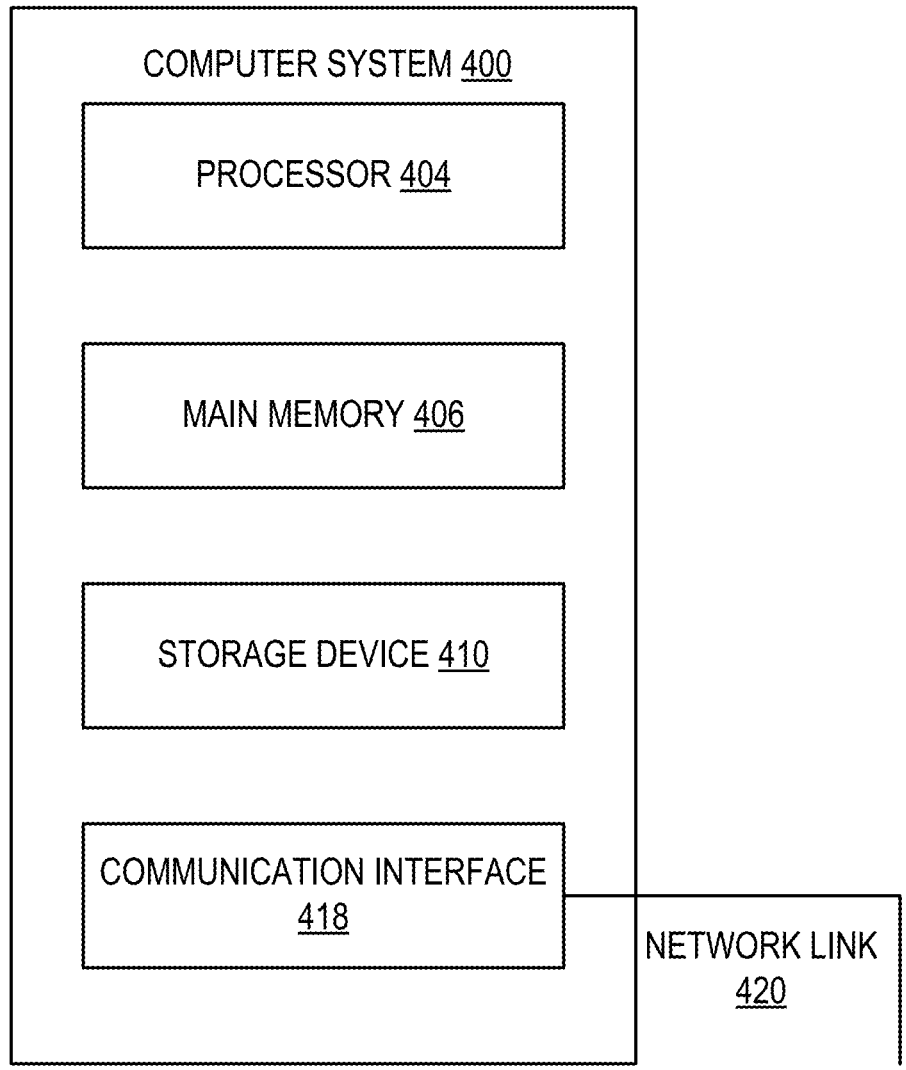
FIG. 4 illustrates a block diagram that illustrates a computer system upon which the examples described may be implemented.

FIG. 4 is a block diagram that illustrates a computer system upon which embodiments described herein may be implemented. For example, in the context of FIG. 1, system 100 may be implemented using one or more servers such as described by FIG. 4.

In an embodiment, computer system 400 includes processor 404, memory 406 (including non-transitory memory), storage device 410, and communication interface 418. Computer system 400 includes at least one processor 404 for processing information. Computer system 400 also includes the memory 406, such as a random access memory (RAM) or other dynamic storage device, for storing information and instructions to be executed by processor 404. The memory 406 also may be used for storing temporary variables or other intermediate information during execution of instructions to be executed by processor 404. The memory 406 may also include a read only memory (ROM) or other static storage device for storing static information and instructions for processor 404. The storage device 410, such as a magnetic disk or optical disk, is provided for storing information and instructions. The communication interface 418 may enable the computer system 400 to communicate with one or more networks through use of the network link 420 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Embodiments described herein are related to the use of computer system 400 for implementing the techniques described herein. According to one embodiment, those techniques are performed by computer system 400 in response to processor 404 executing one or more sequences of one or more instructions contained in memory 406. Such instructions may be read into memory 406 from another machine-readable medium, such as storage device 410. Execution of the sequences of instructions contained in memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for auctioning an item over a network, the method being implemented by one or more processors and comprising:
    associating a profile with each of a plurality of users of an online auction forum, the profile of each user including content corresponding to an avatar for that user; and
    virtualizing an auction for an item for a first user device of a first user of one or more users that each participate in the auction as a bidder or seller for the item,
    wherein virtualizing the auction includes:
        displaying, on the first user device, a plurality of avatars, each avatar being animated and participating in the auction;
        displaying, on the first user device, the plurality of avatars in a virtual environment on the online auction forum, wherein the virtual environment is displayed based on one or more environmental rules associated with the auction and includes selected auction content to simulate events of the auction;
        displaying, on the first user device, the events of the auction through actions of the avatars in the virtual environment, including bids received by users participating in the auction as bidders and one or more bids of the seller;
        in response to a trigger condition defined in the one or more environmental rules, manipulating the virtual environment on the first user device to progress the auction towards completion;
        limiting the ability of the users participating in the auction to communicate with each other based on communication limitations defined in the one or more environmental rules; and
    concurrently with virtualizing the auction for the item for the first user device, communicating with a second user device of a second user of the one or more users to render auction content on the second user device without virtualizing the auction.

2. The method of claim 1, wherein manipulating the virtual environment includes manipulating at least some of the selected auction content and/or avatars to reflect an auction action corresponding to a user submitting a bid.

3. The method of claim 1, wherein bids correspond to the avatar raising a hand or paddle, or standing up.

4. The method of claim 1, wherein the trigger condition includes a time to completion of the auction reaching a threshold and a reserve price for the auction not being met.

5. The method of claim 1, wherein manipulating the virtual environment includes changing the coloring or lighting of the selected auction content.

6. The method of claim 1, further comprising displaying event information for the auction on a webpage separately from virtualizing the auction.

7. The method of claim 1, wherein the plurality of avatars participate in the auction as participants that are present in a room.

8. The method of claim 1, wherein virtualizing the auction includes displaying an avatar for an auctioneer that conducts the auction.

9. A computer system comprising:
    a memory that stores a set of instructions, one or more profiles, and a set of content items;
    one or more processors that access the memory to:
        use the one or more profiles to associate a profile with each of a plurality of users of an online auction forum, the profile of each user including content corresponding to an avatar for that user, the plurality of users including bidders and a seller; and
        use the instructions and the content items to virtualize an auction for an item for a first user device of a first user of one or more users that each participate in the auction as a bidder or seller for the item, by:
            displaying, on the first user device, a plurality of avatars, each avatar being animated and participating in the auction;
            displaying, on the first user device, the plurality of avatars in a virtual environment on the online auction forum, wherein the virtual environment is displayed based on one or more environmental rules associated with the auction and includes selected auction content to simulate events of the auction, wherein the one or more environmental rules are specific to the auction for the item;
            displaying, on the first user device, the events of the auction through actions of the avatars in the virtual environment, including bids received by users participating in the auction as bidders and one or more bids of the seller;
            in response to a trigger condition defined in the one or more environmental rules, manipulating the virtual environment on the first user device to progress the auction towards completion;
            limiting the ability of the users participating in the auction to communicate with each other based on communication limitations defined in the one or more environmental rules; and
            concurrently with virtualizing the auction for the item for the first user device, communicating with a second user device of a second user of the one or more users to render auction content on the second user device without virtualizing the auction.

10. The computer system of claim 9, wherein the one or more processors manipulate the virtual environment by manipulating at least some of the selected auction content and/or avatars to reflect an auction action corresponding to a user submitting a bid.

11. The computer system of claim 9, wherein bids correspond to the avatar raising a hand or paddle, or standing up.

12. The computer system of claim 9, wherein the trigger condition includes a time to completion of the auction reaching a threshold and a reserve price for the auction not being met.

13. The computer system of claim 9, wherein the one or more processors manipulate the virtual environment by changing the coloring or lighting of the selected auction content.

14. The computer system of claim 9, wherein the one or more processors display event information for the auction on a webpage separately from virtualizing the auction.

15. The computer system of claim 9, wherein the plurality of avatars participate in the auction as bidders present in a room.

16. The computer system of claim 9, wherein the one or more processors virtualize the auction by displaying an avatar for an auctioneer that conducts the auction.

17. The method of claim 1, wherein the trigger condition includes a threshold time remaining for the auction or bids increasing to a threshold amount.

18. The computer system of claim 9, wherein the trigger condition includes a threshold time remaining for the auction or bids increasing to a threshold amount.

* * * * *